F. H. ROGERS.
MILK STERILIZING APPARATUS.
APPLICATION FILED AUG. 15, 1917.

1,280,851.

Patented Oct. 8, 1918.
2 SHEETS—SHEET 1.

Inventor:—
Francis Heron Rogers.
By:— B. Singer, Atty.

UNITED STATES PATENT OFFICE.

FRANCIS HERON ROGERS, OF WESTMINSTER, LONDON, ENGLAND.

MILK-STERILIZING APPARATUS.

1,280,851.   Specification of Letters Patent.   Patented Oct. 8, 1918.

Application filed August 15, 1917. Serial No. 186,433.

*To all whom it may concern:*

Be it known that I, FRANCIS HERON ROGERS, residing at Westminster, London, S. W. 1, England, have invented certain new and useful Improvements in and Relating to Milk-Sterilizing Apparatus; and I do hereby declare the following to be a full, clear, and exact description of the invention, such as will enable others skilled in the art to which it appertains to make and use the same.

This invention relates to milk sterilizing apparatus and has special reference to that variety in which the milk circulates in contact with steam chests so that the temperature of the milk is raised to a point slightly below boiling point—preferably about 200–202° F.

It is essential in such apparatus that the walls of the steam chests are thin, that the steam chest segments are readily connected together with steam and liquid tight joints, and yet be capable of rapid dismantling for cleansing purposes. Further, as the walls of the steam chests are thin, it is necessary to avoid direct steam connection through such walls, as otherwise on assembly distortion takes place, and it is further necessary to provide drain cocks or outlets for all of the chests, and effect this in such manner that they are accessible and do not require disconnection when the sterilizing apparatus is cleansed.

The apparatus is of the type in which a central steam chest is provided with a series of external annular steam chests so disposed that annular passages for the flow of milk are formed between the steam chest units, the milk passing into the apparatus and circulating between the walls of the steam chests, the latter being arranged as baffles in the liquor path, until at the outer steam chest the milk overflows in a heated condition and is led to cooling or like devices.

The invention has for its object the provision of an improved apparatus in the construction of which the essential features above set forth are embodied. With this improved construction the apparatus may be dismantled very rapidly, it being necessary only to slacken the bolts by which the top walls and base are held in operative engagement and the cover and other parts can then be lifted out of position.

The invention will now be described with reference to the accompanying drawings, in which:—

Figure 1:
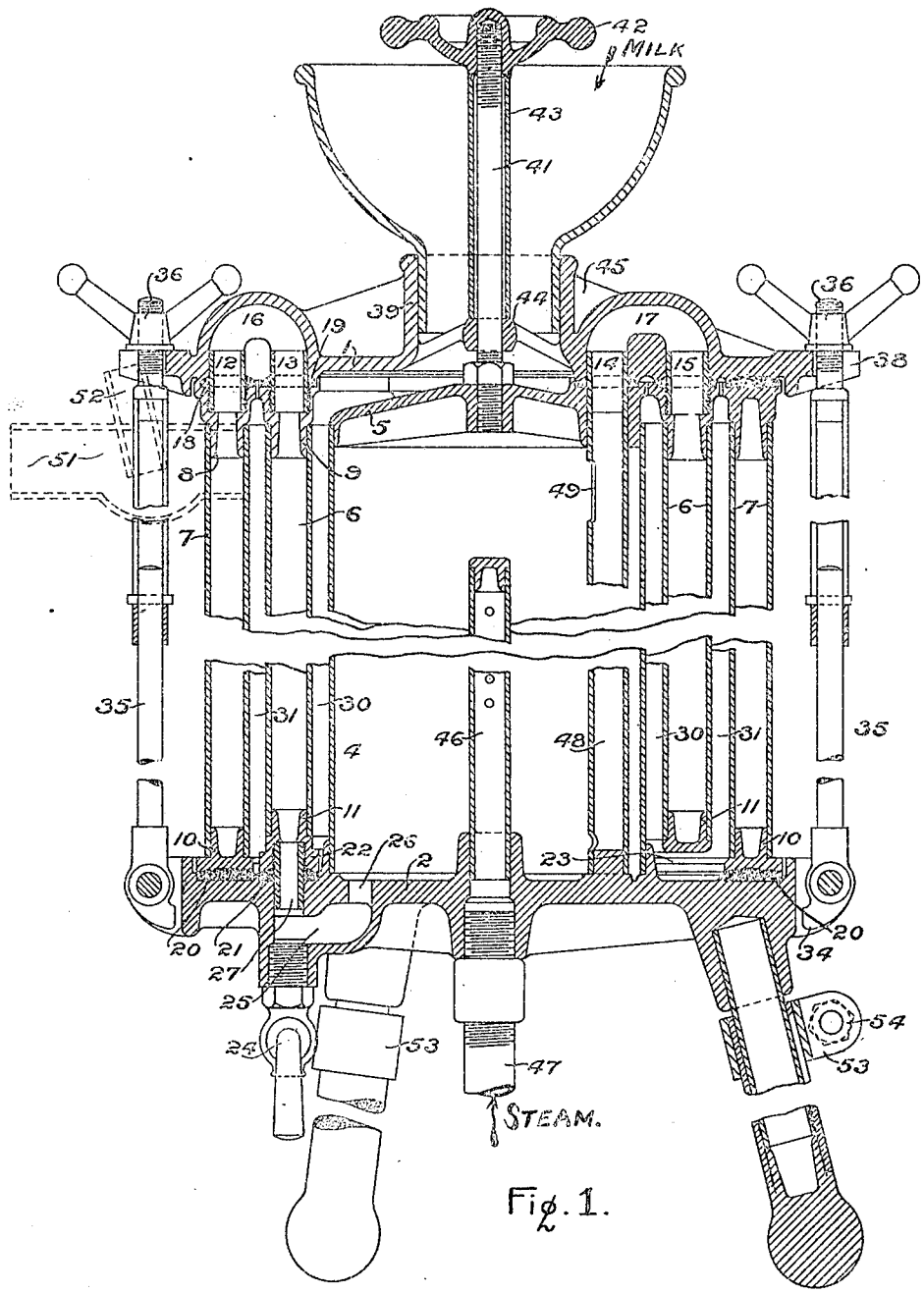
Figure 1 is a vertical section through the apparatus taken on the line A—B of Fig. 2.

In the drawings 1 and 2 indicate respectively top and bottom plates formed as castings, the bottom plate 2 carrying the legs 3 and drain cocks, hereinafter described, the upper plate or cover 1 carrying the milk inlet and steam connectors between the respective chests.

The central steam chest 4 is postitioned upon the base 2 as a thin tubular body closed with a light cast metal top 5. The outer concentric steam chests 6 and 7 are formed with thin metal or tubular sides closed at top and bottom with light metal castings 8, 9, 10 and 11, of annular form to which the sheet metal of the sides is brazed. At suitable points in the top casting 5 of the central chest 4 and top castings of the annular steam chests 6 and 7, protruding nipples 12, 13, 14 and 15 are provided, adapted to enter sockets of ports 16 and 17 formed in the main cover 1 of the apparatus which ports afford steam communication between contiguous steam chests. These nipples which enter the port sockets do not need to be a tight fit therein as they protrude from the upper surfaces of the steam segment covers 8 and 9 which latter are packed by means hereinafter described against the main cover 1 and bush of the apparatus. The said main cover 1 is grooved concentrically on its underside for the reception of packing rings 18 and 19, and the base 2 is also grooved where necessary in a like manner for the reception of packing rings 20 and 21. The outer steam chest segment or annulus 7 is adapted to be packed tight between the main cover 1 and base 2, but the steam segments intermediate between said outer steam chest and the inner or central chest 4 only require packing rings at either top or bottom, and at those points where the nipples 12—15 protrude to enter the sockets of the ports, the said intermediate steam chests being provided preferably with three feet or lugs 22 at either top or bottom so as to leave passages 23 to allow the milk to circulate within the apparatus. The condensed steam collecting within the central and intermediate steam chests is drained off by the provision of a cock 24 attached to a port 25 formed in the base 2 of the apparatus. The port 25 communicates through a port 26 with the central steam chest 4, and by a nipple 27 entering a socket in the base 2 and attached to the casting 11, with the intermediate chest 6. The nipple 27 is arranged to pass through one of the feet 22.

Figure 3:
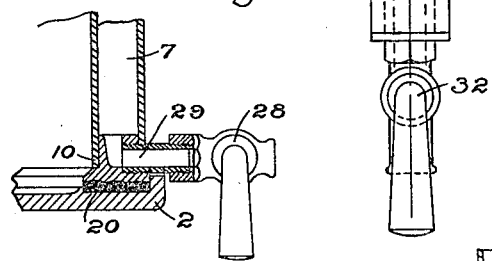
Fig. 3 is a detail view of the steam drain cock.

The outer steam chest 7 is provided with the drain cock 28 illustrated in Fig. 3 which is attached to the same by a nipple 29 screwed into the casting 10. This nipple 29 preferably registers with a groove in the base 2, for the purpose of serving as a guide in assembling the apparatus.

Figure 2:
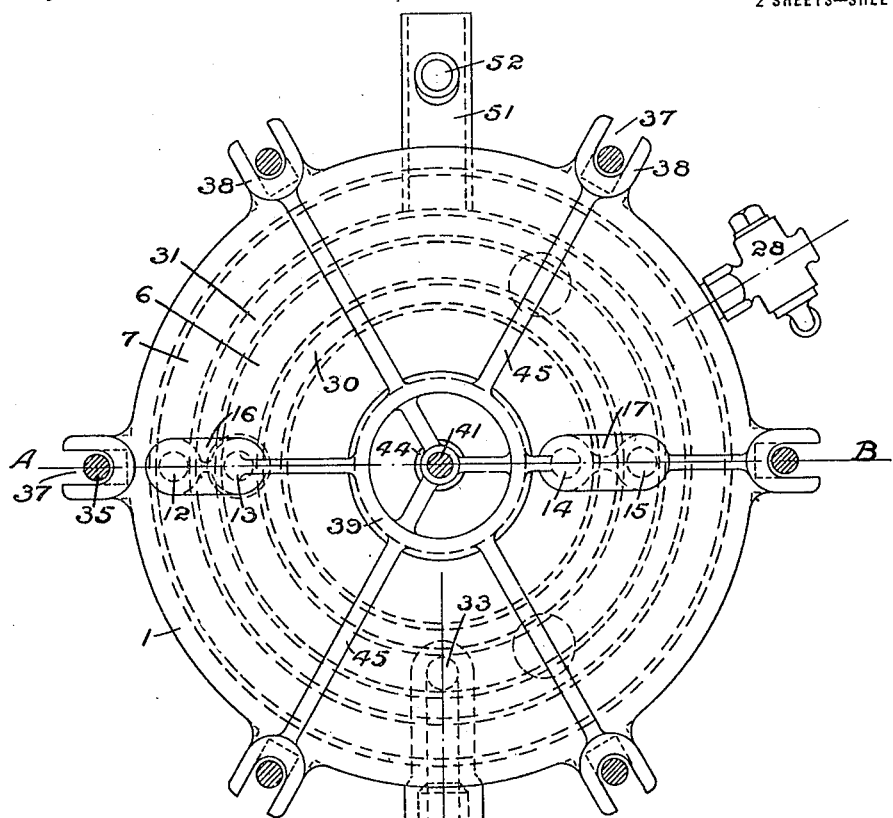
Fig. 2 is a plan of the apparatus.
Figure 4:
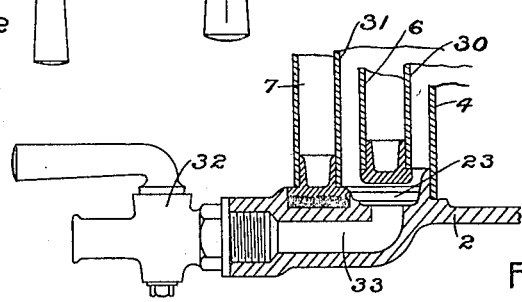
Fig. 4 is a detail view of the milk drain cock.

The steam chests 4, 6 and 7 provide between them annular chambers 30 and 31 for the circulation of the milk under treatment, these chambers communicating by the passages 23 already described. The chambers 30 and 31 are also provided with a drain cock 32, Figs. 2 and 4 communicating with a port 33 formed in the base 2 and entering the milk space by one of the passages 23.

Lugs 34 which protrude from the base carry pivoted tension bolts 35, the upper ends of which are screwed and fitted with fly nuts 36, adapted to engage slots 37 formed in lugs 38 on the cover 1, and these provide the means for clamping the assembled parts of the apparatus together. At the points where the lugs 38 project, the cover 1 is preferably strengthened with radially extending webs 45. The cover 1 is provided with a central aperture 39 into which is fitted a milk receiving and distributing cup 40, and a shaft 41 screwed into the cover 5 of the central steam chest 4 protrudes vertically through the distribution cup and is provided at its outer extremity with a light hand wheel 42 or like tensioning device which abuts against a tubular collar 43, which in turn engages a boss 44 integral with the cover 1 through which the vertical shaft 41 passes. In assembling the machine the intermediate and outer steam segments 6 and 7 are arranged in place with the drain nipples 27 and 29 pushed home in their respective sockets, the cover 1 is then placed on top, care being taken that the packing rings 18 and 19 are in place, the steam nipples 12, 13, 14 and 15 having been previously alined by the insertion of the drain nipples 27 and 29, they readily enter the sockets of the steam ports 16 and 17, and when engagement has been made the central screw tightening device 41 is employed to keep cover 1 in its adjusted position while the external tension bolts 35 are put into place and the whole tightened up.

The operation is as follows:—

Steam is turned on and enters the central chest 4 by a perforated pipe 46 secured in the base 2, a pipe 47 entering the same in alinement with the pipe 46 and communicating with the source of steam supply. Steam leaves the central chest 4 by a port 49 in a pipe 48, fixed within the chest 4 and communicating at its upper end with the nipple 14 by which steam passes through the port 17 and enters the annular chest 6, from which it passes through the port 16 to the outer annular chest 7, escaping by the drain cock 28, or other exhaust fitting. Milk is then run through the machine, the cup 40 spreading it over the conical cover 5 of the inner steam chest 4, causing it to flow down the side thereof into the annular chamber 30 formed by the walls of the chests 4 and 6. The milk leaves the chamber 30 by the passage 23 and enters the annular chamber 31 formed between the chests 6 and 7. The chamber 31 has a milk outlet 51 provided with a thermometer pocket 52, and passing through the walls of the outer steam chest 7.

During this time the milk is always between two heated surfaces, and its temperature rapidly rises until at the exit 51 it has reached 200° F., whence it is passed to the cooler in the known manner. After a given quantity of liquor has passed the apparatus is taken down and cleansed, each segment being separated for this purpose. To enable the operator to more easily accomplish this, the external clamping bolts 35 are made telescopic so that they drop out of the way and give perfect access to all parts. The legs 3 are adjustable and enable the height of the machine to be adapted to the milk inlet pipe or overflow to the cooler. To enable such adjustments to be effected the legs are preferably of telescopic form as shown, and provided with clamps 53 and nuts 54. A gate or like valve arrangement may be provided in the receiving cup to regulate the flow, but this latter object is best achieved by a valve on the milk supply pipe.

By reversing the object of the above machine and passing chilled water through the steam segments the apparatus will equally well act as a cooler but in such case the drain arrangements are not absolutely necessary.

I claim:—

1. A milk sterilizing apparatus comprising a base, annular steam and milk circulating sections adapted to be positioned on said base, a cover for said sections so constructed that clamping of the same in position completes the connections between the milk sections and also between the steam sections.

2. A milk sterilizing apparatus as claimed in claim 1 wherein the walls of each of said steam sections are secured at top and bottom to annular rings forming closures therefor and adapted partially or wholly to engage concentric grooves formed in the cover, packing of rubber or the like being interposed between the ends of said sections and the grooves to insure fluid tight joints.

3. In a milk sterilizing apparatus as claimed in claim 1 nipples projecting upwardly from each of the said steam sections, adapted to engage sockets or ports formed within a steam ported cover whereby the steam sections are placed in communication one with another when the cover is placed in position.

4. A milk sterilizing apparatus as claimed in claim 2, wherein the rings closing the lower ends of the intermediate steam sections are formed with feet or lugs adapted to rest upon the base thereby providing passages for the circulation of milk between said sections, and leveling the sections for closure.

5. A milk sterilizing apparatus as claimed in claim 1 including a central steam chest secured to the base having a conical head, an upwardly projecting shaft secured centrally therein, a boss formed centrally in the cover and surrounding the shaft, a sleeve bearing on said boss, a hand wheel on the shaft bearing on said sleeve, whereby on tightening same the alinement and security of the parts is adjusted prior to tightening up.

In testimony whereof I affix my signature.

FRANCIS HERON ROGERS.

Copies of this patent may be obtained for five cents each, by addressing the "Commissioner of Patents, Washington, D. C."